Sept. 25, 1962 G. R. HARDESTY ETAL 3,055,346
INCREMENTAL ACTUATOR
Filed April 24, 1961 3 Sheets-Sheet 1

INVENTORS.
GILBERT R. HARDESTY
ROBERT D. McMILLAN, JR.
BY
*H.C. Goldwire*
AGENT

United States Patent Office 3,055,346
Patented Sept. 25, 1962

3,055,346
INCREMENTAL ACTUATOR
Gilbert R. Hardesty, Irving, and Robert D. McMillan, Jr., Houston, Tex., assignor, by mesne assignments, to Ling-Temco-Vought, Inc., Dallas, Tex., a corporation of Delaware
Filed Apr. 24, 1961, Ser. No. 105,194
12 Claims. (Cl. 121—38)

This invention relates to hydraulic motors and means for control of their energization and more particularly to means for providing two-directional actuation of a hydraulic motor in discrete steps or increments of predetermined size.

Briefly described, the invention comprises, in association with a hydraulic system pressure line and return line and a hydraulic motor, a pair of valves including a pair of bores in each of which is mounted a stem shiftable between first and second positions in the bore. A metering chamber slidably houses a piston biased to a first, stopped position in which the chamber is emptied and movable by inflow of fluid from the motor to a second position at which a stop halts the piston motion and prevents the further inflow of fluid. A plurality of passageways interconnect the bores, motor, metering chamber, and hydraulic pressure and return lines. The valve stems are each provided with lands whose locations are such that, with each valve stem in its first position, both ports of the motor are shut off from the pressure line and metering chamber, while the latter is open to the return line. When a given one of the stems is shifted to its first and the other stem left in its second position, a given port of the motor is connected with the pressure line and the other port of the motor to the metering chamber, which accepts a fixed volume of fluid determined by the location of the stop halting the piston in its second position. The motor thus moves a fixed distance in a particular direction during filling of the metering chamber. Upon positioning both stems again in their first position, the motor is hydraulically locked, and the bias on the metering piston moves it back to its first position, thus emptying the metering chamber. If the above sequence is repeated, the motor moves through another fixed interval in the same direction as before. If, on the other hand, the operation following emptying of the metering chamber consists of moving the other of the stems from its first to its second position, the given port of the motor is connected to the metering chamber and the motor's other port to the pressure line. The resulting filling of the chamber with fluid from the motor again allows the motor output member a fixed increment of motion, but this time in the opposite direction. The motor may thus be reversed when desired and moved as far in either direction as may be required. Means are provided for shifting the valve stems to obtain any desired operation of the motor, and these means preferably comprise pilot valves controlling the positions of the stems and having elements in turn controlled by a torque motor adapted for receiving electrical pulses and responsive thereto for shifting one stem in response to a pulse so polarizing the torque motor armature as to deflect the same in one direction and for shifting the other stem in response to a pulse producing an opposite deflection of the armature.

A major object of the invention is to provide a means for controlling a hydraulic motor and obtaining operation of the output member of the same, in either direction, in discrete steps or increments of predetermined size.

Another object is to provide a means such as stated, by virtue of which the motor output member may be moved as far as desired in either direction and reversed, after any motion thereof, at any point in its range of travel.

A further object is to provide a precise and accurate means for controlling the positioning of the output member of a hydraulic motor.

A still further object is to avoid the inaccuracies of positioning of the output member of a hydraulic motor controlled by a means utilizing an analog signal and to provide, for the hydraulic motor, a control means of greater accuracy of operation and adapted for operation in response to digital signals.

Still further objects and advantages will be evident from the specification and claims and from the accompanying drawing illustrating an embodiment of the invention and modifications thereof.

Figure 1:
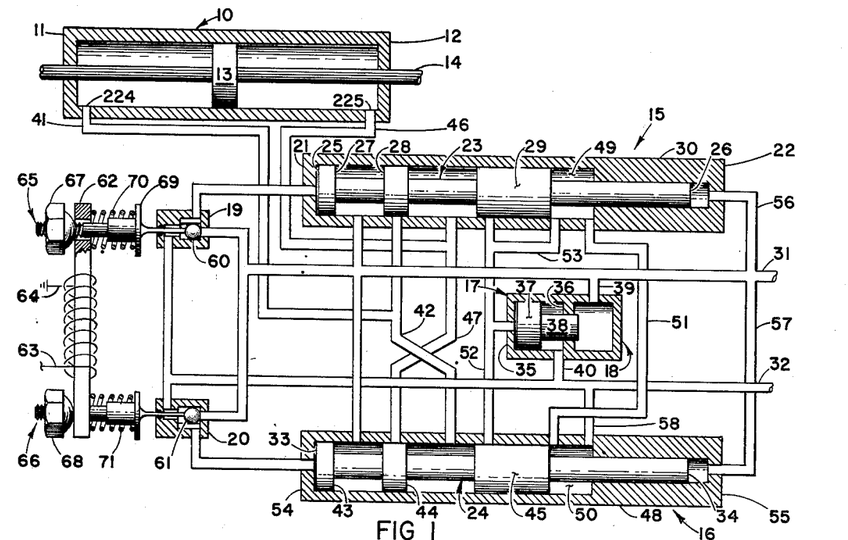
FIGURE 1 is a schematic view of a preferred embodiment of the invention showing a hydraulic motor, the two valve bores and stems, the metering chamber, and the means providing and controlling their connection with each other and the hydraulic pressure and return lines, the valve stems both being in their first position.

With reference now to FIGURE 1, the hydraulic motor shown by way of specific example includes a housing in form of a barrel 10 in which is movably mounted an output element or piston 13 whose rod 14 provides a means of connection of the motor with any desired object (for example, an aircraft control surface to be moved and positioned by the motor). Where, as will ordinarily be desired, the introduction of a given volume of hydraulic fluid into one end of the barrel must produce a piston motion of the same length as if introduced into the barrel other end, the two faces of the piston 14 are equal in area. This preferably is effected by continuing the piston rod 14 to extend from both sides of the piston 13 and through both end walls 11, 12. The motor housing 10 has first and second ports or openings 224, 225 which are located respectively in or near the first end wall 11 and second end wall 12. Hydraulic flow admitted into either of the ports 224, 225 moves the piston 13 and forces an equal volume of fluid out the other port 224 or 225. By blocking either port 224 or 225 at a time when fluid must escape through the port 224 or 225 in order for the piston 13 to move, the piston is locked in position.

While the output member, i.e., the piston rod 14 of the hydraulic motor of the specific example, has a linear motion in consequence of admission of fluid into one port 124 or 125 of the motor housing 10 while allowing the exit of fluid from the housing's other port, it will be understood that other kinds of hydraulic motors, for example one having an output member whose motion is rotary rather than linear, may be employed.

The first and second bores 15, 16, metering chamber 17, pressure chamber 18, and pilot valve chambers 19, 20 are machined or otherwise formed in material of which a discrete piece may be provided, as shown, for each of these items; or some or all of them may be formed in a single piece of material preferably mounted directly on or in a recess formed in the material of the barrel 10. In the first case, the various passageways shown as lying outside the two bores 15, 16 are made of appropriate tubing; in the second case, some or all the passageways are formed in the bodies in which the bores 15, 16, metering and pressure chambers 17, 18, and pilot valve chambers 19, 20 are formed.

The first bore 15 has first and second ends formed by end walls 21, 22. Within the first bore 15 is shiftably mounted a first valve stem 23 having a first end 25 rendered larger in diameter than the second end 26 by the presence thereat of a land 27 slidably engaging the bore wall. The area of the smaller-diameter second end 26 is smaller than that of the first end 25. Between its first land 27 and second end 26, the first stem 23 is provided with second and third lands 28, 29. The bore diameter is such as to accommodate the lands 27, 28, 29 throughout their range of axial motion, and the bore 15 is provided with a reduced-diameter portion 30 accommodating the smaller-diameter end portion 26 of the stem. In the embodiment shown in FIGURE 1, the first, larger stem end 25 lies against and is stopped by the bore first end 21 when the stem 23 is in its first position. When the stem 23 is in its second position (FIGURE 3), the second end 26 is halted by the bore second end wall 22, which thus serves as the second stop for the stem 23, the opposite end wall 21 being the first. The stem first end 25 thus is spaced from the bore first end 21 when the stem 23 is in its second position.

The first stem 23 is biased toward its first position by admitting hydraulic pressure, from the hydraulic system pressure line 31, into the bore second end 22. The hydraulic pressure thus applied produces on the stem 23 a force which is a function of the area of its smaller end 26 and which continuously urges it toward its first position. The connection of the pressure line 31 into the bore second end conveniently is made by a passageway 56.

The second bore 16 and valve stem 24 are made with parts and proportions exactly corresponding, except as hereinafter noted, to those of the first bore 15 and stem 23. The two bores 15, 16 preferably lie in register and alignment with each other and with their respective first ends 25, 33 facing in the same direction.

The metering chamber is preferably a cylindrical bore 17 which has first and second end walls 35, 36 which serve as fixed stops for the metering piston 37 slidably mounted in the bore. In its first position, the piston 37 is stopped by the chamber first end wall 35; in its second position, the piston 37 is halted by the other end wall 36.

Means are provided for biasing the piston 37 to its first position. The end wall 36 forms a wall in common between the metering chamber 17 and a pressure chamber 18, the latter being rigidly fixed in relation to and axially aligned with the metering chamber. A plunger 38 of smaller diameter than and connected to the metering piston 37 extends through the end wall 36 into the pressure chamber 18. The pressure chamber 18 is continuously connected, as by the passageway 39, into the pressure line 31; thus, the plunger 38, at its end lying within the pressure chamber 18, provides a surface continuously exposed to fluid pressure of the pressure line 31 and mechanically connected to the metering piston 37. The metering piston consequently is biased to its first position in which, as will become apparent, the metering chamber 17 is substantially emptied of fluid received from the motor barrel 10.

A port opens into the metering chamber through its first end wall 35 and a plurality of ports open into each of the bores 15, 16 to accommodate the connection of a plurality of passageways (to be enumerated). The end of the metering chamber 17 adjacent the pressure chamber 18 is vented to allow the relatively free passage of fluid into and out of that end of the metering chamber in conjunction with movement of the metering piston 37. The vent opening preferably is connected by a passageway 40 into the hydraulic system return line 32 to prevent loss of any small leakage which might occur past the metering piston 37 upon filling the metering chamber, through its first end wall 35, with hydraulic fluid.

The available technics of the art should be applied in making the piston 37 as leak-proof as possible.

The pressure line 31 is connected into the first bore 15 at a point located between the first and second lands 27, 28, which are spaced far enough apart to leave the port of the pressure line 31 open in both positions of the stem 23. The pressure line 31 is similarly connected into the second bore 16.

Figure 3:
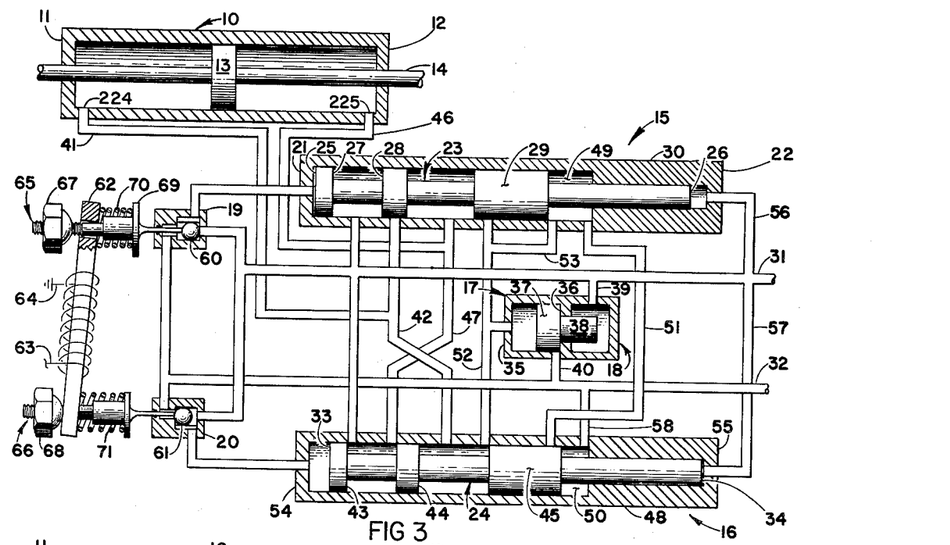
FIGURE 3 is a view of the device of FIGURE 1 with the second valve stem moved to its second position and the first valve stem retained in its first position for obtaining an increment of motor output member movement in a given direction.

The first fluid-conducting means connects the motor housing first port 224 with both bores 15, 16 and comprises a passageway 41 leading from near the barrell first end wall 11 and opening into the first bore 15 at a point covered by the first stem second land 28 when the stem is in its first position (FIGURE 1) and uncovered when the first stem 23 is in its second position (FIGURE 3). It will be noted that the first and second lands 27, 28 form the end walls of a chamber into which the pressure line 31 is continuously admitted and which is connected with the barrel first port 224 through the passageway 41 when the first stem 23 is in its second position and shut off from the barrel first port 224 when the stem 23 is in its first position. According to one mode of construction, the passageway 41 is connected to the second bore 16 by a branch 42 which enters the second bore 16 at a point which lies between the second stem second and third lands 44, 45 and is uncovered in both positions of the second stem 24.

The second fluid-conducting means connects both bores 15, 16 with the motor housing second port 225. At each stem 23 or 24, a chamber will be seen to lie between and to have end walls formed by the second and third lands 28, 29 or 44, 45. A passageway 46 extends from the barrel second port 225 into the first bore 15 between the first stem second and third lands 28, 29 at a point where its opening into the first bore is uncovered in both positions of the first stem 23. From the passageway 46, a branch 47 opens into the second bore 16 at a point covered by the second land 44 when the second stem 24 is in its first position and uncovered when the stem 24 is in its second position.

The third fluid-conducting means is provided for connection of the return line 32 into both bores 15, 16 and comprises, in the embodiment shown in FIGURE 1, a passageway 58 branching from the return line 32 and opening into the second bore at a point adjacent the bore smaller-diameter portion 48 and unobstructed by the third land 45 in both positions of the stem 24. It will be seen that a chamber 49 or 50 is formed in each bore 15, 16 adjacent each third land 29 or 45 on the side of the latter the farther removed from the second land 28 or 44. These chambers 49, 50 are parts of the third fluid-conducting means, which further comprises the pasageway 51, the latter opening into the second bore chamber 50 at a point uncovered when the third land 45 is in its first and covered when the third land is in its second position.

The remaining end of the passageway 51 opens into the first bore chamber 49 at a point which is uncovered in both positions of the first stem 23.

The fourth fluid-conducting means connects the metering chamber 17, through an opening in its first end wall 35, with the first and second bores 15, 16 through a passageway 52 which enters the second bore 16 at a point covered in the first and uncovered in the second position of the second stem third land 45 as shown in FIGURES 1 and 3. The other end of the passageway 52 enters the first bore 15 at a point similarly related to the first stem third land 29. In addition, the passageway 52 has a branch 53 which enters the first bore chamber 49 at a location uncovered in the first and covered in the second position of the first stem third land 29.

While, after becoming familiar with the relationships and mode of construction described herein, one skilled in the art will conceivably be able to devise modifications of the connections of the passageways of the third and fourth fluid-conducting means, it will become apparent that the mode in which this is accomplished is of critical importance to operation of the invention. The first stem third land 29 is so dimensioned and located that, in moving the third land 29 to its second position, the passage branch 53 is closed at the bore chamber 49 before the fourth fluid-conducting means passage 52 is uncovered where it opens into the first bore 15. Similarly, the opening of the passage 51 into the second bore chamber 50 is shut off, when the second stem 24 moves to its second position, by the third land 45 before uncovering of the opening of the passage 52 into the second bore 16. In return of each stem 15, 16 from its second to its first position, the order of the just-described openings and closings is reversed. Further, the second land 28 or 44 of each stem 23 or 24 is so dimensioned and located that the first fluid-conducting means passage 41 or branch 42 is opened into the respective bore 15 or 16, when the stem 23 or 24 moves to its second position, slightly ahead of opening of the fourth fluid-conducting means passage 52 into the respective bore 15 or 16, and conversely is the last to be closed in movement of the stem 23 or 24 back to its first position.

There thus are provided passageways, including those of the first through fourth fluid-conducting means, which connect the bores 15, 16, as described, with each other and with the two ends ports 224, 225 of the motor barrel 10, the pressure and return lines 31, 32, and the metering chamber 17. It is of importance to note that the lands of the stems 23, 24 are so located that, with both stems in the first position (FIGURE 1), the pressure line 31 and fourth fluid-conducting means passageway 52 and branch 53 are shut off, by the third lands 29, 45, from the first and second fluid-conducting means passages 41, 46 and branches 42, 47, and the metering chamber 17 is connected into the return line 32 through the third and fourth fluid-conducting means passages 47, 51, 52 and branch 53.

With the first stem 23 in its first position and second stem 24 in its second position (FIGURE 3), the pressure line 31 is connected, through the second bore 16 and second fluid-conducting means branch 47 and passage 46, into the barrel second-end port 225 while the barrel first-end port 224 is connected through the first fluid-conducting means passage 41 and branch 42, second bore 16, and fourth fluid-conducting means passageway 52, into the metering chamber 17.

Figure 4:
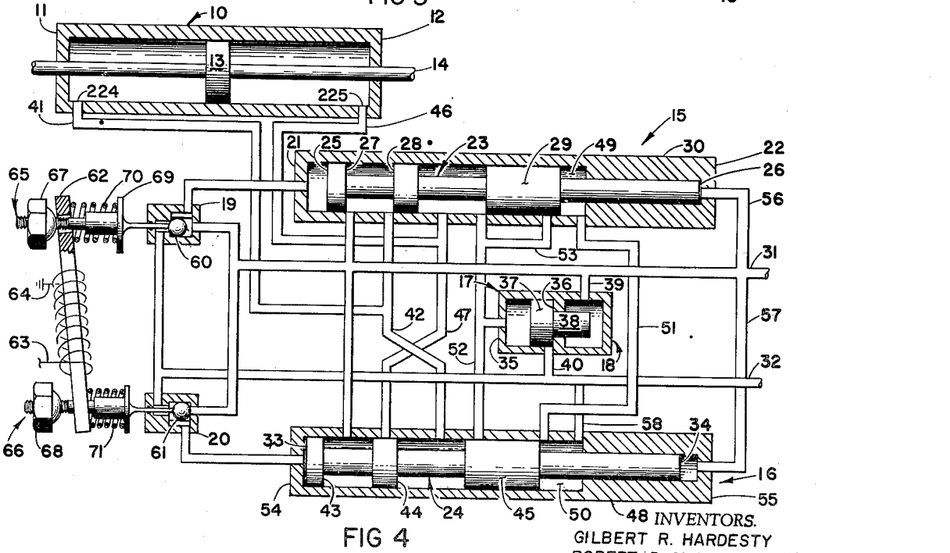
FIGURE 4 is a similar view, the valve stems having been positioned to obtain an output member motion in the opposite direction.

As shown in FIGURE 4, placing the first stem 23 in its second position while retaining the second stem 24 in its first position connects the pressure line 31 through the first fluid-conducting means passageway 41 into the barrel first port 224. This is accomplished by connection of the barrel second port 225 into the metering chamber 17 through the second fluid-conducting means passageway 46, the first bore 15, and the fourth fluid-conducting means passageway 52.

It will be understood that, when either stem 23 or 24 is in its second position, the third fluid-conducting means is shut off by a land 29 or 45 of the stems 23, 24 from the fourth fluid-conducting means. Thus, placing the first stem 23 in its second position results in shutting off the branch 53 by the first stem third land 29, while the second stem third land 45 shuts off the passageway 51 when the second stem 24 is in its second position. In both positions of both stems 23, 24, the first and second fluid-conducting means passages 41, 46 and branches 42, 47 are always shut off from the third fluid-conducting means passages 47, 51 which connect the bores 15, 16 with the return line 32.

Otherwise and more generally stated, placing both stems 23, 24 in the first position shuts off both barrel ports 224, 225 from the pressure line 31 and metering chamber 17, thus hydraulically locking the motor piston 13; the metering chamber 17 is open to the return line 32. If a given one of the stems 23, 24 is shifted to the second position while the other remains in its first position, a given port 224 or 225 of the barrel 10 is connected to the pressure line 31 and the barrel other end 11 or 12 is connected to the metering chamber 17. Maintaining the given stem 23 or 24 in its first position and shifting the other to its second position connects the given port 224 or 225 at the end 11 or 12 of the barrel to the metering chamber 17 and the barrel other end 11 or 12 to the pressure line 32. Placing either stem 23 or 24 in its second position always results in shutting off the metering chamber 17 from the return line 32.

The means for selectively shifting each and either one of the stems 23, 24 from its first to its second position while leaving the other stem in its first position will now be described.

First, means are provided for biasing each stem 23, 24 to its first position, in which position the stems accordingly will remain, and to which they will be returned, unless a force greater than the biasing force is applied to a stem 23 or 24 for moving it to and holding it in its second position. The biasing force is obtained by connecting the second end 22 or 55 of each bore 15, 16 into the hydraulic pressure line 31 as by passages 56, 57, thus continuously applying on the smaller, second end 26 or 34 of each stem 23, 24 a fluid pressure which urges the stem to its first position.

For overcoming the biasing force on either stem 23 or 24, as may be selected, a pair of pilot valves having respective, three-way chambers 19, 20 housing shiftable elements 60, 61 are provided. Each pilot valve chamber 19, 20 is connected between the pressure line 31, return line 32, and the first end 21 or 54 of a respective bore 15 or 16 at a location adjacent the second, larger end 25 or 33 of a respective stem, connection into the bore being made through the first end wall 21 or 54. The elements 60, 61 are shiftable between respective first and second positions for varying connection of the pressure line 31 and return line 32 to the bore ends 21, 54. In its first position, as shown in FIGURE 1, each element 60, 61 blocks entry of fluid into its respective chamber 19, 20 from the pressure line 31, meanwhile leaving unobstructed the connection, through the chamber 19 or 20, of the return line 32 with the associated bore first end 21 or 54. With a pilot valve element 60 or 61 in its first position, then, the larger end 25 or 33 of the associated stem 23 or 24 has placed thereon only the pressure of the return line 32, and the stem 15 or 16 is held in its first position by the greater biasing force on its smaller end 26 or 34. Upon shifting, for example, the second pilot valve element 61 to its second position as shown in FIGURE 3, the second stem first end 33 is shut off from the return line 32 and opened to the pressure line 31 through the second pilot valve chamber 20. As a result, the same hydraulic pressure is placed on both ends 33, 34 of the stem 24, and as the area of its first end 33 is the larger, the biasing force is overcome and the stem 24 is moved to its second position. On the other hand, as shown in FIGURE 4, shifting of the first element 60 to its second position shuts off the first bore first end 21 from the return line 32 and connects it into the pressure line 31, with the similar result of moving the first stem 23 to its second position.

It follows, therefore, that the provision of a means for shifting the pilot valve elements 60, 61 will provide control over the positioning of the stems 23, 24 and hence of the operation of the hydraulic motor. The preferred means for accomplishing this function comprises a torque motor with an armature 62 connected with the pilot valve elements 60, 61 and adapted, as by coil leads 63, 64, for receiving electrical signals or pulses. A particular motor which has yielded satisfactory performance in this capacity is the Model 103–7 torque motor marketed by American Measurement and Control, Inc., of Waltham, Massachusetts.

Various arrangements are found in the coils employed in commercially available torque motors and energizable, in each case, for deflecting the torque motor armature. Thus, a single coil may be employed as in FIGURES 1–4. In other cases, a pair of coils are employed, which coils, depending on the specific design of the torque motor, may or may not be wound in the same direction. Many modes of connection of the torque motor coil or coils for obtaining the operation of the torque motor described herein thus are possible and since these are well known in the art will not be discussed in detail. The mode of connection employed, however, must be one which is compatible with the signal source employed for driving the motor armature to the end that a signal calling for an incremental motion of the actuator output member in one direction will effect a given polarization and hence deflection of the motor armature in one direction, while a signal calling for an opposite increment of motion of the output member will produce an opposite polarization and deflection in the armature. The drawing shows only so much of the torque motor, which is schematically represented, as will suffice to show the connection of the other elements therewith, and the torque motor shown in FIGURES 1–4 will be understood to be representative of a motor having only one coil as well as of a motor having a plurality of coils connected to operate as one or of which only one is used. The torque motor coil is shown as grounded at one end through a lead 64 and provided at the other end with a lead 63 through which pulses positive or negative with respect to the ground may be supplied to the coil.

The means connecting the armature 62 with the pilot valve elements preferably comprises a stem 65 slidably extending into the first pilot valve chamber 19 and so aligned with the shiftable element 60 and the opening of the pressure line 31 into the chamber 19 that the latter opening is closed by the element 60 when the stem 65 is fully inserted. The stem 65 extends slidably through an opening near one end of the centrally pivoted armature 62 and has on its end, where it extends through the armature, a stop such as a nut 67. Intermediate the armature 62 and pilot valve chamber 19, the stem 65 has a flange 69 or equivalent on which is footed one end of a coiled spring 70 whose other end bears against the armature 62, the spring thus being held in compression, through the stem 65, between the valve element 60 and armature 62. A similar stem 66 and spring 71 are provided at the other end of the armature 62 and second pilot valve chamber 20. The stems 65, 66 and springs 70, 71 are constructed identically, and their lengths are such that, with no torque applied to the armature 62, the springs 70, 71 bias the armature toward and hold it in a neutral position (FIGURE 1) wherein a first condition of the pilot valve elements 60, 61 is obtained, i.e., one in which both elements are in their first position. Thus, in the neutral position of the armature 62, each bore first end 21 or 54 is connected with a given line selected from the group including the pressure and return lines 31, 32, in the present example the connection being with the return line 32.

Upon reception of, for example, a positive pulse at the lead 63, the armature 62 is deflected in a given direction (for example, clockwise as in FIGURE 3). The armature 62 slides along the first pilot valve stem 65 and further compresses the spring 70, thus in no wise diminishing the force with which the first element 60 is held in its first position. The same motion of the armature 62, however, applies a force at the nut 68 which pulls the second stem 66 out of the second chamber 20 sufficiently to allow the fluid pressure of the pressure line 31 to drive the second element 61 from its first position wherein it closes off the pressure line 31 and into its second position in which it is seated for closing off the opening of the return line 32 into the chamber 20. Movement of the armature 62, then, in one (for example, clockwise) direction is accompanied by retention of the first pilot valve element 60 in its first position and release of the other element 61. A second condition thus is set up wherein a given bore 15 or 16 (for example, the first bore 15) retains its connection at its first end 21 with the previously mentioned selected line 31 or 32 (in the present example, the return line 32) and the other bore is connected to the other line 31 or 32 (in the example, the pressure line 31).

A negative pulse received by the torque motor lead 63 results in counterclockwise deflection of the armature 62 (FIGURE 4). This armature movement in another, opposite direction away from its neutral position occasions release of the first shiftable element 60 and retention of the second element 61 in its first position, the first element 60 being moved by hydraulic pressure to its second position. This third condition of the elements 60, 61 is accompanied by the givent bore (i.e., the first bore 15) being connected at its first end 21 into the pressure line 31, while the other bore 16 remains connected with the return line 32, previously designated as the line selected to be the one into which both pilot valve chambers 19, 20 are connected when both elements 60, 61 are in their first position. Note that, by virtue of the presently described construction, each of the pilot valve elements 60, 61 is always retained in its first position whenever the other element 60 or 61 is released. Further, when either element 60 or 61 is in its second position, it must be returned to its first position before it is possible to release the other element 60 or 61 for allowing it to be moved to its second position. Thus, only one pilot valve element 60 or 61 is movable at a time to its second position.

The detailed operation of the parts of the invention having already been described, it will be understood that, with the armature 62 neutrally positioned (FIGURE 1), the motor piston 13 is hydraulically locked and immovable, and any item, for example an aircraft control surface, connected to the piston rod 14 is held firmly and unyieldingly in fixed position. With the motor barrel 10 connected to the bores 15, 16 as shown, deflection of the armature 62 in a clockwise direction (FIGURE 3) results in motion of the motor piston 13 to the left by a distance which is exactly predetermined and which is a function of the volume of fluid required for moving the metering piston 37 from its first to its second position. Only this volume of fluid is allowed to escape from the actuator barrel first port 224, for (as explained) the second stem third land 45 shuts off the passage 51 leading from the return line 32 to the metering chamber 17 a brief instant before opening the passage 41 into the second bore, thus establishing connection between the metering chamber 17 and barrel first port 224 for permitting fluid flow out of the barrel. As a consequence, no flow can ever pass from the barrel 10 into the return line 31 without first having been measured and stopped by the metering chamber 17 and piston 37. The result is an accurate predetermination of the increment of movement of the output member 13 with rod 14 in response to reception of a pulse by the torque motor. All pulses supplied to the torque motor, of course, must be of sufficient persistence in time to allow movement of the metering piston 37 from its first to its second position. By the same token, the time elapsing between pulses must be great enough to allow complete emptying of the metering chamber 17 by movement of the metering piston 37, by its biasing means, back to its first position.

At the termination of the received pulse, no torque is placed on the armature 62 by electrical forces, and the armature is returned to its neutral position (FIGURE 1) by expansion of the first spring 70, thus forcing the second pilot valve stem 66 against the second element 61 to return the latter to its first position. Leakage from the barrel 10 into the return line 32 is prevented by the second stem third land 45, which closes the metering chamber 17 off from the barrel 10 before opening the chamber 17 into the return line 32, whereupon the metering chamber 17 is emptied as described and the motor piston 13 is again locked in position after having passed through a predetermined step or increment of travel.

As many more positive pulses, properly spaced, may be supplied to the torque motor as may be required for moving the motor piston 13 a desired number of steps to the left. If, on the other hand, if it is desired to move the piston 13 to the right by the predetermined interval established by the capacity of the metering chamber 17, the torque motor is supplied with a negative pulse for rotating its armature 62 counterclockwise as shown in FIGURE 4. The resulting motion of the first stem 66 to its first position shuts off the return line 32 from the metering chamber 17 and allows filling of the latter with fluid from the motor barrel second port 225.

It will be evident that, by effecting a proper choice of the number, polarity, and sequence of pulses supplied to the torque motor, the motor piston 13 may be made to move in any desired pattern and number of steps (within its range of travel) to the left or right, with its reversal being readily effected after any one step. The steps may be made as small as desired by appropriately dimensioning the metering chamber 17 and piston 37; and, by supplying the pulses at a high rate, the motion of the piston 13 is made, for practical purposes in many applications, virtually continuous.

Figure 2:
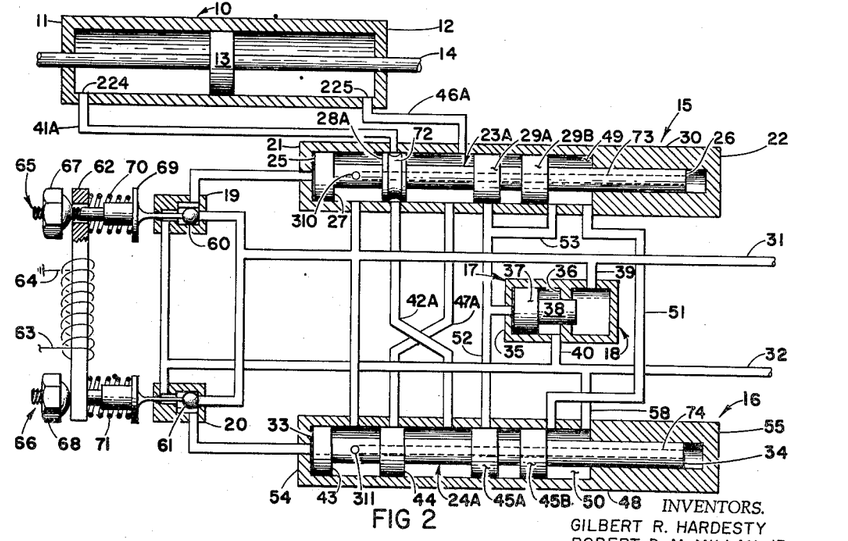
FIGURE 2 is a view similar to FIGURE 1 and showing an alternate mode of connection of elements of the invention.

FIGURE 2 shows a modification of the device of FIGURES 1, 3, and 4 in which the branch 47 (FIGURE 1) of the second fluid-conducting means passage 46 is replaced by a passage 47A (FIGURE 2) still connected as before, at one of its ends to the second bore 16 but connected at its other end into the first bore 15 at a point in register with the opening of the passage 46A into the first bore. The second fluid-conducting means thus comprises the passage 47A, the space within the first bore 15 between the second and third lands 28A, 29, and the passage 46A extending as before between the first bore 15 and barrel second port 225. The first fluid-conducting means is modified in a somewhat similar manner, the passage 41A extending from the first bore 15 to the barrel first port 224 and the branch 42 of FIGURE 1 being connected into the first bore 15 at a point in register with the location at which the passage 41A opens into the same. The branch 42 (FIGURE 1) thus appears as the passage 42A (FIGURE 2). In order that fluid may flow from the barrel first end 11 to the second bore 16 through the first fluid-conducting means when the second stem 24A is in its second position, a peripheral groove 72 is formed in the second land 28A intermediate its two faces. With the first stem 23A in its first position, the groove 72 provides communication between the passages 41A, 42A and hence is a part of the first fluid-conducting means. In addition, it has been found desirable to lighten each third land 29 by removing such material from its middle as is expedient without disrupting its function of opening and closing the openings of the fourth fluid-conducting means passage 52 and branch 53 and third fluid-conducting means passage 51 into, respectively, the first and second bores 15, 16. The third land thus becomes, in FIGURE 2, a spaced pair of lands 29A, 29B at the first stem 23A and 45A, 45B at the second stem 24A. Connection of the bore second ends 22, 55 into the pressure line 31 at the stem second ends 26, 34 is accomplished by providing an axial passage 73 or 74 in each stem 23A, 24A which extends from the stem second end 26 or 34 and terminates, between the first and second lands of the particular stem 23A or 24A, at a radial passage 310 or 311 opening into the respective bore 15 or 16. The effect of this arrangement is to bias each stem 23A or 24A, as described above, to its first position. It will be readily understood that the overall operation of the invention, when modified as in FIGURE 2, is the same as that already described in connection with FIGURES 1, 3, and 4.

Figure 5:
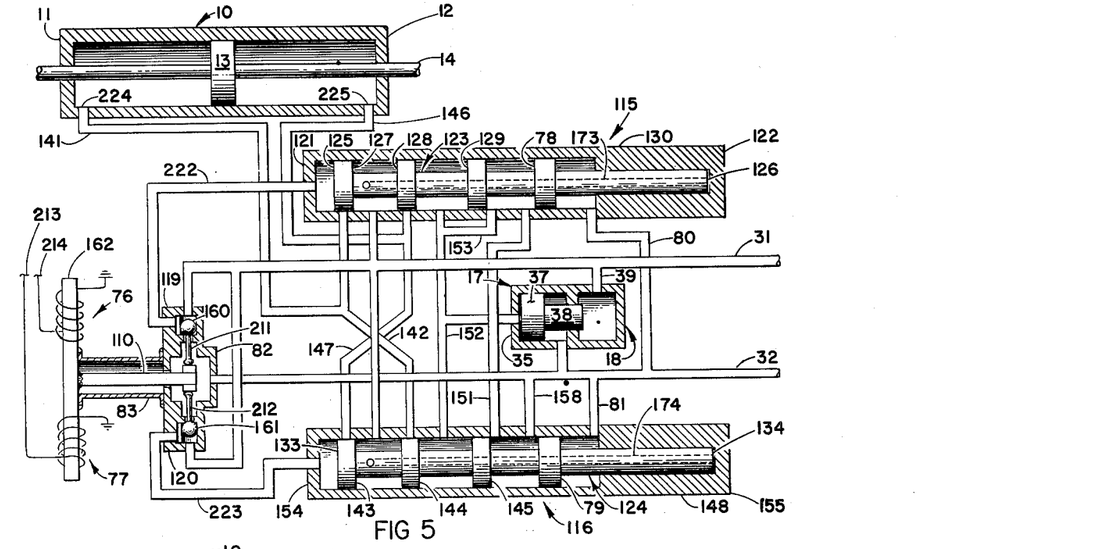
FIGURE 5 is a view similar to FIGURE 1 and showing a modification of the invention.

FIGURE 5 shows an important modification of the invention in which, in the neutral position of the torque motor armature 162 and corresponding first condition of the pilot valve shiftable elements 160, 161, the selected line to which the first and second bore first ends 121, 154 are connected is the hydraulic pressure line 31. The metering and pressure chambers 17, 18, metering piston 37, and components 10, 13, 14 of the hydraulic motor are the same as in FIGURE 1, as are the first and second bores 115, 116 except for certain differences, to be enumerated, in the mode of connection of the various passageways into them. The valve stems 123, 124 again each have, respectively, a larger first end 125 or 133 located in the region of a respective bore first end 121 or 154 and a smaller, second end 126 or 134. The stem 115 or 116 is in its first position when its first end 125 or 133 is spaced from the bore end wall 121 or 154 and lies against the end wall 121 or 154 when shifted to its second position. The biasing means for continuously urging the metering piston 37 to its first position wherein the metering chamber 17 is emptied into the passageway 152 of the fourth fluid-conducting means remains as in the first embodiment. The hydraulic pressure line 31 continues to be connected into the space within both bores 115, 116 lying between the first and second lands of each stem 123 or 124, and the port through which it enters is free of obstruction in both positions of the stems.

The first fluid-conducting means again connects the barrel first port 224 to the two bores 115, 116 via the passageway 141 and branch 142. The opening of the passageway 141 into the first bore 115 is covered by the first stem first land 127 when in its first position and uncovered to connect the pressure line 31 with the barrel first-end port 224 when the stem 123 is in its second position (i.e., in contact with the first end wall 121). The opening of the branch 142 into the second bore 116 is covered by the second stem second land 144 of the second stem 124 when the latter is in its first position. Shifting of the second stem 124 to its second position opens the branch 142 into the second bore 116 between the second and third lands 144, 145.

In similar fashion, the second fluid-conducting means passageway 146 extends from the barrel second-end port 225 to the first bore 115, and its branch 147 extends to the second bore 116. The opening of the passageway 146 into the first bore 115 is covered by the first stem second land 128 and the opening of the branch 147 into the second bore 116 is covered by the second stem first land 143 when the stems 123, 124 are in their first positions. Movement of the second stem 116 to its second position thus connects the pressure line 131 into the barrel second end 12.

The third fluid-conducting means again is provided for connecting the return line 32 into both bores 115, 116. A passageway 158 connects the return line 32 into the space lying within the second bore 116 between the third and fourth lands 145, 79 at a point uncovered when the second stem 124 is in its first position and covered by the fourth land 79 when the stem 124 is in its second position. The passageway 151 connecting the two bores 115, 116 opens into the second bore 116 at a location uncovered in both positions of the second stem 124. The location at which the passageway 151 opens into the first bore 115 between the first stem third and fourth lands 129, 78 is uncovered when the first stem 123 is in its first position and closed by the fourth land 78 when the stem 123 is in its second position. Since fluid must pass through it on its way to the return line 32, the space within each bore 115, 116 between the third and fourth lands of each stem operates as and forms a part of the third fluid-conducting means.

The fourth fluid-conducting means passageway 152 opens as before into the two bores 115, 116 and into the metering chamber 17 through the first end wall 35 of the latter. The point at which the passageway 152 enters each bore lies between the second and third lands of a respective stem 115 or 116 and is never closed. The opening of the branch 153 into the first bore 115 between the first stem third and fourth lands 129, 78 also is open at all times.

As in FIGURE 1, the stem portion adjacent each stem's smaller, second end 126 or 134 functions as a plunger which is received in a smaller-diameter bore portion 130 or 148. The main larger-diameter portion of the first bore 115 must be long enough to allow room for the fourth land 78 when the stem 123 is shifted to its first position, and (as shown) the bore 115 conveniently is made still somewhat longer. The result is a chamber lying between the fourth land 78 and the adjacent end of the bore smaller-diameter portion 130. Unimpeded shifting of the stem 123 requires that this chamber be vented, and this preferably is accomplished by a passageway 80 leading into the return line 32, a similar passageway 81 being provided for the same purpose at the second bore 116.

Each stem 123, 124 again is biased by connecting its associated bore second end 122 or 155 into the hydraulic line 31, this being effected, at the first stem, by a radial bore intermediate the first and second lands 127, 128 from which an axial passageway 173 extends through the stem second end 126. A similar bore and passageway 174 are provided in the second stem 124. The resulting, hydraulically imposed force on each stem smaller end 126, 134 biases the stems 123, 124 to their second position, to which both would be moved and held in the absence of a greater and opposing force.

Means are required, therefore, for selective shifting of one or the other stem 123, 124, as desired, from its second to its first position. The operation of this means is such that while it is capable of holding both stems simultaneously in their first position against the weaker force of the stem biasing means and of shifting either stem back again from its second to its first position, its operation does not allow more than one stem 123 or 124 at a time to be shifted out of its first position. The means for shifting the stems again includes a pair of pilot valve chambers 119, 120 each connected between a respective bore first end 121 or 154 and the pressure and return lines 31, 32. Each pilot valve chamber 119, 120 houses a shiftable element such as a ball 160 or 161 which is biased by pressure from the pressure line 31 to a first position wherein it closes off the opening of the return line 32 into its respective chamber 119 or 120 and which is shiftable to a second position wherein it closes off the opening of the pressure line 31 into the respective chamber and opens the return line 32, through a respective passage 222 or 223, into the first end 121 or 154 of one of the bores.

Shifting of the pilot valve elements 160, 161 is accomplished by a torque motor of which only the armature 162 and an oppositely wound pair of coils 76, 77 are shown. To cite examples of suitable motors, both the torque motor Model M–224 sold by Servomechanisms, Inc., of Buffalo, New York, and the torque motor Model 102–50 available from American Measurements and Control Co., Waltham, Massachusetts, have been employed with satisfactory results. The return line 32 opens into a housing 82 which in turn ports into each of the pilot valve chambers 119, 120 at a point opposite the opening of the pressure line 31 into the respective chamber 119 or 120. A flexible tube 83 is sealingly and rigidly footed on the housing 82 at one of its ends, and its other end is similarly attached to and hence closed by the armature 162 at the center of the latter. A T-member 110 mounted on the armature 162 extends axially within the tube 83 and into the housing 82 through a wall opening in the latter large enough to permit sufficient lateral motion of the T-member 110. While sealing the entry of the T-member 110 into the housing 82, the tube 83 also serves to provide a spring force which biases the armature 162 to its neutral position. From each side of the T-member 110 a stem 211 or 212 extends toward the adjacent opening of the return line 32 into the pilot valve chamber 119 or 120. The lengths of the stems 211, 212 are such that, with the armature 162 (and hence the T-member 110) in its neutral position, both pilot valve elements 160, 161 are held seated, by hydraulic pressure, in the openings through which the return line 32 communicates with the pilot valve chambers 119, 120. In this first condition of the pilot valve shiftable elements 160, 161, the hydraulic pressure supplied to the stems 123, 124 at their first, larger ends 125, 133 forces them both to their first position as shown in FIGURE 5. The pressure line 31 and fourth fluid-conducting means passage 152 are both shut off from the first and second fluid-conducting means connecting respectively with the barrel first and second ports 224, 225, while the metering chamber 17 is connected into the return line 32 through the third and fourth fluid-conducting means branch 153 and passages 152, 151, 158. Consequently, the motor piston 13 is locked and the biasing force applied to the metering piston 37 forces it, as shown, to its first position wherein the contents of the metering chamber 17 are emptied into the passageway 152 and thus to the return line 32.

It will be understood that application of a positive pulse to the lead 213 of coil 77 will result, for example, in clockwise rotation of the armature 162 and thus in a linear motion of the stem 212 which will seat the second movable element 161 in the opening of the pressure line 31 into the second pilot valve chamber 120; the other element 160 will not be moved. Upon the movable elements 160, 161 having been disposed in this second condition, the stem biasing means bottoms the second stem first end 125 against the second bore first end wall 154, whereby the first and second lands 143, 144 are moved out of the way to connect the motor barrel second-end port 225 with the pressure line 31 through the second fluid-conducting means branch 147 and passageway 146 and the barrel first-end port 224 to the metering chamber 17 through the first and fourth fluid-conducting means passageways 141, 152 and branch 142, the metering chamber 17 thereby being filled to permit a measured step of the motor piston 13.

If, instead, the armature 162 is rotated counterclockwise, by a positive pulse to lead 214 of coil 76 (or by a negative pulse to lead 213 of coil 77), to place the movable elements 160, 161 in their third condition wherein the second element 161 remains seated to shut off the return line 32 from the second pilot valve chamber 120 and the first movable element 160 is forced into a position in which it closes off the opening of the pressure line 31 into the first pilot valve chamber 119 and connects the first stem first end 125, through the passage 80, with the return line, the second stem 124 remains in its first position and the first stem 123 is moved to its second position. The result, which will be understood from the above, is connected of the barrel first end 11 with the pressure line 31 and second end 12 with the metering chamber 17.

When either stem 123 or 124 is moved from its first to its second position, and because of the mode of location of the stem lands, a stem fourth land 78 or 79 closes off a third fluid-conducting means passageway 151 or 158 before connecting the motor barrel 10 to the metering chamber 17, thus preventing any loss of unmetered fluid to the return line 32. It also is preferable that the first stem second land 128 and second stem first land 143 be so located that the pressure line 31 is opened into the barrel 10, upon movement of either stem 123 or 124 to its second position, before the barrel 10 is connected into the metering chamber 17.

Figure 6:
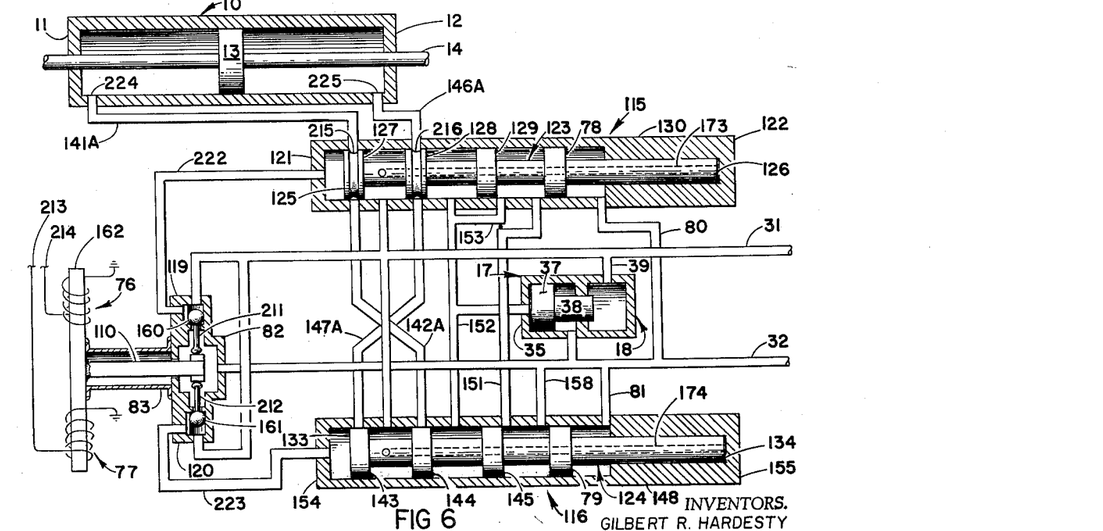
FIGURE 6, a view similar to FIGURE 5, shows an alternate mode of effecting connection of the valve bores and associated components of FIGURE 5.

FIGURE 6 shows a modification of the device of FIGURE 5 wherein a peripheral groove 215 is formed in the first land 127 and a similar groove 216 in the second land 128 of the first stem 123. The groove 215 enables the connection of the first fluid-conducting means passageway 141A into the first bore 115 through an opening which is in register with the first land groove 215 when the first stem 123 is in its first position and connection of an end of the branch 142A, through an oppositely located opening, into the first bore 115 rather than directly to the passageway 141A. The second fluid-conducting means passageway 146A and branch 147A similarly have ends connected into the first bore 115 through respective openings which are in register with the second land groove 216 when the first stem 123 is in its first position. The first land groove 215 thus serves to connect the first fluid-conducting means passageway 141A and branch 142A, while the second land groove 216 similarly serves the second fluid-conducting means passageway 146A and branch 147A. It will be clear that this change, while facilitating the forming of the necessary passageways, particularly where both bores 115, 116 and at least some of the passageways are drilled or otherwise formed in one integral piece of material, in no way alters the operation of the device already described.

The present invention is of excellent utility in all cases where it is desired to obtain, from a hydraulic motor, stepwise, reversible motion in precisely predetermined increments. To quote a few examples, the invention is useful as a hydraulic counter in computers and the like and is readily employed as the driving means for an electrical stepping switch. An important field in which it is of great value is in aircraft and especially in rocket-powered and other missiles for the operation of control surfaces, etc. In a missile, for example, whose hydraulic pump is battery-driven, the electro-hydraulic valves previously employed for servo control of the hydraulic motors which position the control surfaces, nozzles, etc. have required, as essential to their operation, a continuous, non-productive flow of pumped hydraulic fluid, which wastage has made necessary the use of excessively large and heavy batteries for driving the pumps. While these valves, typified by the valve shown in the U.S. Patent 2,767,689 to William C. Moog, have been of great merit in that they have greatly advanced the art of servo control of aircraft, they operate on a principle whereby a flapper-type element (or equivalent) has oppositely disposed faces on which are constantly impinged a pair of jets of hydraulic fluid. The flapper is positioned by a torque motor and is moved through very small distances by the latter to alter the jet flow, to greater or lesser degree as may be required, to cause variation in the positioning of a stem which in turn controls the flow of hydraulic fluid to a motor connected to the valve. The flow of the two jets against the flapper must be maintained at all times, even under normal operating conditions in which the valve is most of the time neutrally positioned. Since the jet flow is from the hydraulic system pressure line back to the return line and since its energy does nothing to move the motor operated by the valve, it is the occasion of a loss of energy which, where the pump is battery-powered rather than engine-driven, becomes of serious significance. As will be evident from the description of the present invention, there is no fluid flow whatever during the periods when the valve stems of the device are both in their first position; the neutral-position wastage of pumped fluid occurring in previous valves of comparable utility is entirely eliminated. Much less energy, therefore, is required for driving the hydraulic pump, and the saving is by no means a token one. To cite a typical example, it has been reliably calculated that the batteries required for driving the hydraulic pumps of a current defensive missile are reducible in weight by over 60% upon employment of the present invention in the missile hydraulic system.

The present invention has the further important advantage of greatly increased reliability as compared to servo-controlled hydraulic actuators employing previous control valves for effecting accurate positional adjustment, throughout its stroke, of the piston of a hydraulic motor. Two sources importantly contribute to the much higher reliability of the present device. First, the stem of a representative, prior servo control valve often shifts only slightly in effecting a direction of fluid to one or the other end of the associated motor barrel, typical motions often ranging down to an amplitude as small as 0.0002 inch. The stem of such a valve is, by necessity, quite closely fitted in its bore; and it all too readily sticks or binds therein, to the detriment of valve operation. Such valves are, of course, extremely sensitive to contaminants which, in spite of great care and effort directed to their exclusion or removal, eventually occur in the hydraulic fluid. The contaminants aggravate the tendency toward sticking and furthermore are very troublesome in partially or totally clogging critical flow-areas. In the valve utilized according to the present invention, sticking of the valve stems is eliminated by virtue of their never being called upon to make small, almost microscopic movements in response to delicately balanced hydraulic forces; their shifting entails vigorous, full-throw motions produced, in each direction, by a strong and ruggedly sufficient force supplied from the system pressure line. As to critical flow-areas, previous servo valves have required that some of their orifices be very small; because of the two-position mode of operation of the valve stems and the operation of the hydraulic motor in discrete steps, the orifices in the valving of the present invention are readily made much larger and therefore are less sensitive to contaminants. To provide typical data as a basis for comparison, a previously known and commercially accepted servo valve utilizes certain orifices as small as 0.008 inch. By contrast, a marketed version of the present invention utilizes, in its valving, no orifice smaller than 0.047 inch, a flow-area approximately 25 times the larger.

Figure 7:
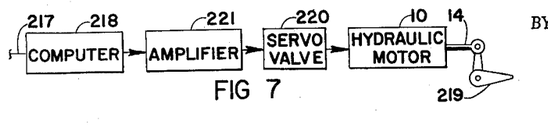
FIGURE 7 is a schematic representation of one mode of connection of the invention to a signal-supplying source.

Closely related to its increased reliability is the superior accuracy of operation of the present invention. Previous electro-hydraulic servo valves have employed torque motors energized by analog signals, i.e., signals of continuous variation in voltage, current, etc. As the variations of signal value which are significant to operation of the ordinary torque motor and valve are quite small, serious errors are introduced by amplifier drifts and non-linearities, variations in power supply, system gain variations accompanying changes in load, temperature, etc., and non-linearities of response in the torque motor. The relatively gross pulses by means of which the torque motor of the present control valve is energized are of an "either-or" nature, and minor fluctuations in the electrical values of these signals are of no consequence. The signals are supplied by any desired means, but in an important application of the invention are provided as in FIGURE 7. The computer 218 receives, via the lead 217, information calling for retention of the item 219 positioned by the piston rod 14 of the hydraulic motor of the present invention in its current position or for its repositioning by a movement of given amplitude in one direction or the other. The computer 218 produces, in response to the received information, a digital signal comprising pulses corresponding in polarity and number to the desired direction of movement and the number of fillings of the metering chamber (forming, as shown at 17 in FIGURES 1-6, a part of the servo valve shown at 220 in FIGURE 7) required for obtaining it. These pulses are received by the amplifier 221, which amplifies them and passes them to the valve 220 for operation of the latter to obtain the motion of the motor rod 14 commanded by the computer 218. In conventional systems wherein an analog command signal is received by a servo-amplifier, a follow-up transducer connected to the item positioned must be employed to provide a signal which enables the amplifier continuously to compare the command signal with the actual position of the actuated item and thus to shut off the servo valve when the item has reached the command position. Note that no follow-up signal need be supplied to the amplifier 221 employed to provide electrical energization of the valve 220 of FIGURE 7.

Besides the considerable advantages already enumerated, it will be evident that the present invention, while providing greatly improved operation and weight savings, also makes possible a large saving in costs of manufacturing, maintenance, etc. because of the relaxation of manufacturing tolerances made possible by its mode of construction and operation. For example, the dimensional criticality of the various orifices, land widths, valve stem stroke, etc. of the valving shown herein is much less than in previous servo valves; further, much less refinement is required in electrical equipment which may be employed to supply operating signals to the servo valve. It frequently is desired to employ the output of a digital computer to operate a servo valve, but since the valves have previously employed an analog signal, it has been necessary to employ a digital-to-analog converter between the servo-amplifier and computer. This expensive electrical item is not necessary when employing the present invention wherein, as in FIGURE 7, the servo-amplifier 221 may employ directly the output of a digital computer 218.

While only one embodiment of the invention, together with modifications thereof, has been described in detail herein and shown in the accompanying drawing, it will be evident that various further modifications are possible in the arrangement and construction of its components without departing from the scope of the invention.

We claim:

1. In combination with a hydraulic motor having a housing and an output element movably mounted therein, the housing having first and second ports for permitting hydraulic fluid to flow in and out of the housing for moving the output element: material in which are formed first and second bores and a metering chamber; a first valve stem mounted in the first bore and shiftable therein between first and second positions; a second valve stem similarly mounted and shiftable in the second bore; a piston mounted in the metering chamber and slidable therein between first and second positions; means biasing the metering chamber piston to its first position; first fluid-conducting means for connecting the motor first port and both bores; second fluid-conducting means for connecting the motor second port with both bores; a hydraulic pressure line connected to both bores; a hydraulic return line and third fluid-conducting means for connecting the same to both bores; fourth fluid-conducting means connecting the metering chamber at one location with one bore and at two locations with the other bore; and lands on the valve stems so located that with each stem in its first position the pressure line and fourth fluid-conducting means are shut off by the lands from the first and second fluid-conducting means and the metering chamber is connected through the third and fourth fluid-conducting means into the return line, with the first and second stems respectively in their first and second positions the pressure line and first fluid-conducting means are respectively connected into the second and fourth fluid-conducting means, with the first and second stems respectively in their second and first positions the pressure line and second fluid-conducting means are respectively connected into the first and fourth fluid-conducting means, and with either valve in either of its positions the first and second fluid-conducting means are shut off from the third fluid-conducting means, the third fluid-conducting means being shut off by a land from the fourth fluid-conducting means wherever either of the stems is in its second position.

2. The combination recited in claim 1, the metering chamber comprising fixed stops against which the metering piston lies in its first and second positions.

3. The combination recited in claim 1, the metering piston biasing means comprising a surface exposed to fluid pressure of the pressure line and mechanically connected with the metering piston.

4. The combination recited in claim 1, the metering chamber having an end wall and the metering piston biasing means including a pressure chamber continuously connected with the hydraulic pressure line, and a plunger of smaller diameter than the piston which extends from the latter through the end wall into the pressure chamber.

5. In combination with a hydraulic motor having a housing and an output element movably mounted therein, the housing having first and second ports for permitting hydraulic fluid to flow in and out of the housing for moving the output element; material in which is formed a pair of bores and a metering chamber; a valve stem shiftably mounted in each of the bores and movable between first and second positions; a piston slidably mounted in the metering chamber; a plurality of ports opening into the bores; a plurality of passageways connecting the bores, at the ports opening thereinto, with each other and with the two ports of the motor, pressure and return lines, and metering chamber; lands on the valve stems so located in relation to the ports opening into the bores that with each stem in its first position both ports of the motor are shut off by the lands from the pressure line and the metering chamber is shut off from the motor ports and open to the return line, while with only a given one of the stems shifted to its second position a given port of the motor housing is connected to the pressure line and the housing other port to the metering chamber, and with only the other of the stems shifted to its second position the given port of the housing is connected to the metering chamber and the housing other port to the pressure line, one of the lands being in position at one of the ports of the bores to shut off the metering chamber from the return line when either of the stems is shifted to its second position; and means biasing the metering piston toward a position in the metering chamber in which the latter is substantially emptied into one of said passageways.

6. The combination set forth in claim 5, said combination further comprising means for selectively shifting each of the stems from its second to its first position while leaving the other stem in its first position; and means biasing each of the stems to its second position.

7. The combination set forth in claim 5 and further comprising means for selectively shifting each of the stems from its first to its second position while leaving the other stem in its first position; and means biasing each of the stems to its first position.

8. The combination set forth in claim 5, each of the stems having a first and a second end and said combination further comprising: means biasing each stem, at its first end, toward one of said first and second positions; a pair of pilot valves each connected between the pressure and return lines and an end of a respective bore adjacent the second end of the stem therein; and motor means connected with the pilot valves and energizable for varying the latter from a first to second and third conditions, in the first condition of the pilot valves both bores being connected with a given line selected from a group including the pressure and return lines, in the second condition a given bore retaining connection with said selected line and the other bore being connected to the other line from the group including the pressure and return lines, and in the third condition said given bore being connected with said other line and the other bore with said selected line.

9. The combination claimed in claim 8, said selected line being the hydraulic pressure line.

10. The combination claimed in claim 8, said selected line being the hydraulic return line.

11. In combination: a hydraulic actuator having a barrel with first and second ends defined by end walls, a piston, and a rod extending from the piston through at least one of the end walls; material in which are formed first and second bores, a metering chamber, and a pressure chamber axially aligned with the metering chamber and having an end wall adjacent the metering chamber; a first valve stem mounted in the first bore and shiftable therein between first and second positions; a second valve stem similarly mounted and shiftable in the second bore; a piston mounted in the metering chamber and slidable therein between first and second positions; a plunger smaller in diameter than and connected to the piston and extending through the pressure chamber end wall into the pressure chamber; a hydraulic pressure line connected to both bores and the pressure chamber; first fluid-conducting means for connecting the motor barrel first end with both bores; second fluid-conducting means for connecting the motor barrel second end with both bores; a hydraulic return line and third fluid-conducting means for connecting the same to both bores; fourth fluid-conducting means connecting the metering chamber at one location with one bore and at two locations with the other bore; first and second ends of each of the bores and each stem having a larger first end and smaller second end, the first end of each stem lying adjacent the first end of the corresponding bore when the stem is in its first position and spaced therefrom when in its second position; means continuously applying fluid pressure of the pressure line to each stem at its second end, whereby each stem is biased toward its first position; lands on the valve stems so located that with each stem in its first position the pressure line and fourth fluid-conducting means are shut off by the lands from the first and second fluid-conducting means and the metering chamber is connected through the third and fourth fluid-conducting means into the return line, with the first and second stems respectively in their first and second positions the pressure line and first fluid-conducting means are respectively connected into the second and fourth fluid-conducting means, with the first and second stems respectively in their second and first positions the pressure line and second fluid-conducting means are respectively connected into the first and fourth fluid-conducting means, and with either valve in either of its positions the first and second fluid-conducting means are shut off from the third fluid-conducting means; pilot valve means connected between each bore, at its first end, and the pressure and return lines and including first and second elements each shiftable between first and second positions for varying connection of said lines to a respective bore, shifting of each element to its first position being accompanied by connection of the associated bore first end with the return line and shifting of each element to its second position being accompanied by connection of the associated bore to the pressure line; a torque motor having an armature with a neutral position and adapted for receiving positive electrical pulses for moving the armature in one direction and negative electrical pulse for moving the armature in an opposite direction away from the neutral position; and resilient means for connecting the armature to the pilot valve elements and biasing the armature to its neutral position wherein both pilot valve elements are held in their respective first positions by the armature and resilient means, movement of the armature in said one direction and other direction from its neutral position being accompanied, respectively, by release of the first pilot valve element and second pilot valve element from its respective first position, each one of said pilot valve elements being retained in its first position by the armature and resilient means whenever the other pilot valve means is released from its first position.

12. In combination: a hydraulic actuator having a barrel with first and second ends defined by end walls, a piston, and a rod extending from each side of the piston through the end walls; material in which are formed first and second bores, a metering chamber, and a pressure chamber axially aligned with the metering chamber and having an end wall adjacent the metering chamber; a first valve stem mounted in the first bore and shiftable therein between first and second positions; a second valve stem similarly mounted and shiftable in the second bore; a piston mounted in the metering chamber and slidable therein between first and second positions; a plunger smaller in diameter than and connected to the piston and extending through the pressure chamber end wall into the pressure chamber; a hydraulic pressure line connected to both bores and the pressure chamber; first fluid-conducting means for connecting the motor barrel first end with both bores; second fluid-conducting means for connecting the motor barrel second end with both bores; a hydraulic return line and third fluid-conducting means for connecting the same to both bores; fourth fluid-conducting means connecting the metering chamber at one location with one bore and at two locations with the other bore; first and second ends of each of the bores and each stem having a larger first end and smaller second end, the first end of each stem being spaced from the first end of the corresponding bore when the stem is in its first position and lying adjacent thereto when in its second position; means continuously applying fluid pressure of the pressure line to each stem at its second end, whereby each stem is biased toward its second position; lands on the valve stems so located that with each stem in its first position the pressure line and fourth fluid-conducting means are shut off by the lands from the first and second fluid-conducting means and the metering chamber is connected through the third and fourth fluid-conducting means into the return line, with the first and second stems respectively in their first and second positions the pressure line and first fluid-conducting means are respectively connected into the second and fourth fluid-conducting means, with the first and second stems respectively in their second and first positions the pressure line and second fluid-conducting means are respectively connected into the first and fourth fluid-conducting means, and with either valve in either of its positions the first and second fluid-conducting means are shut off from the third fluid-conducting means; pilot valve means connected between each bore, at its first end, and the pressure and return lines and including first and second elements each shiftable between first and second positions for varying connection of said lines to a respective bore, shifting of each element to its first position being accompanied by connection of the associated bore first end with the pressure line and shifting of each element to its second position being accompanied by connection of the associated bore to the return line; a torque motor having an armature with a neutral position and adapted for receiving positive electrical pulses for moving the armature in one direction and negative electrical pulse for moving the armature in an opposite direction away from the neutral position; and means for connecting the armature to the pilot valve elements and biasing the armature to its neutral position wherein both pilot valve elements are held in their respective first positions by the armature and resilient means, movement of the armature in said one direction and other direction from its neutral position being accompanied, respectively, by release of the first pilot valve element and second pilot valve element from its respective first position, each one of said pilot valve elements being retained in its first position by the armature and resilient means whenever the other pilot valve means is released from its first position.

References Cited in the file of this patent

UNITED STATES PATENTS

| | | |
|---|---|---|
| 2,650,609 | Herbst | Sept. 1, 1953 |
| 2,700,986 | Gunn | Feb. 1, 1955 |
| 2,832,318 | Paine | Apr. 29, 1958 |